UNITED STATES PATENT OFFICE.

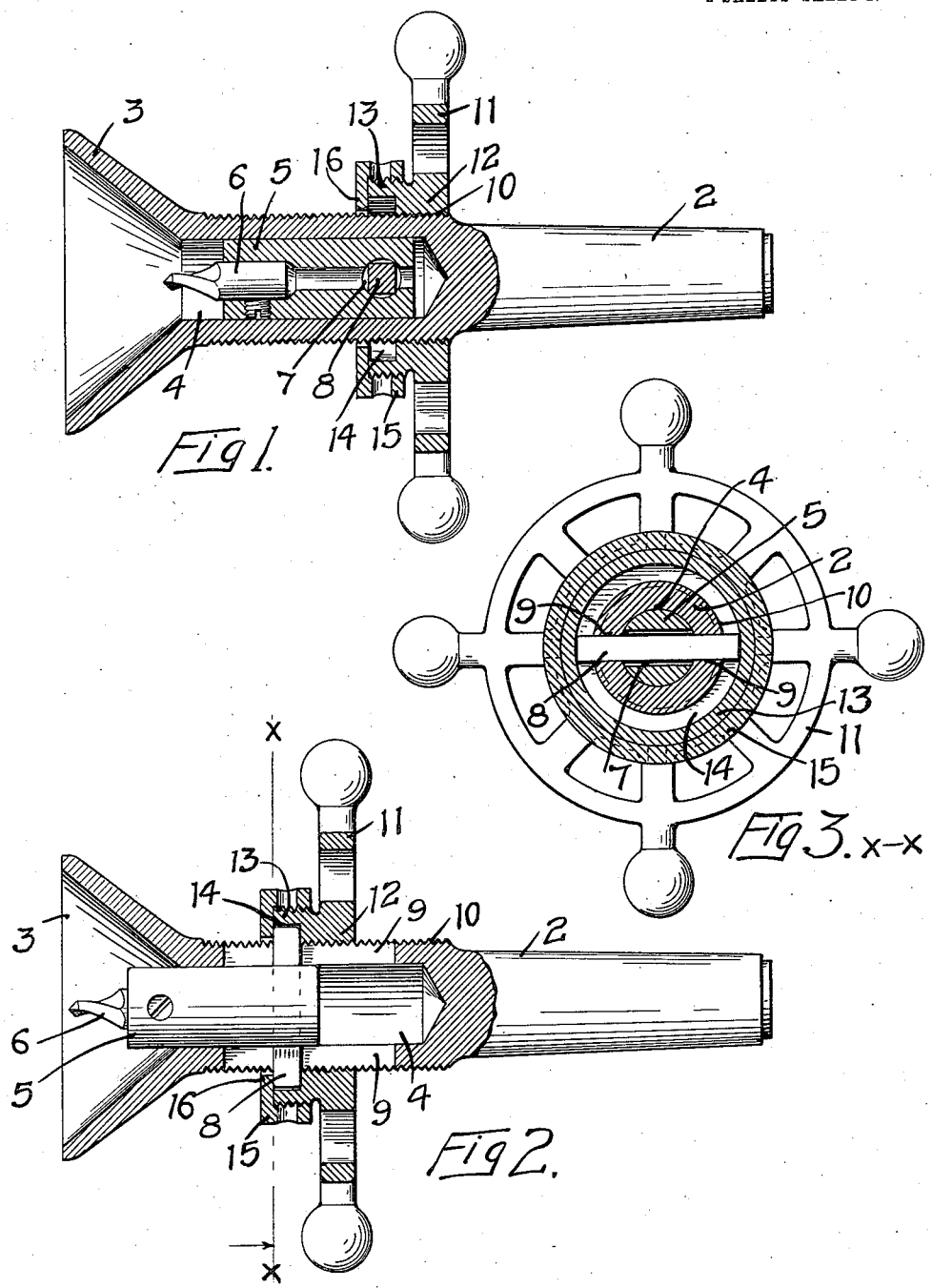

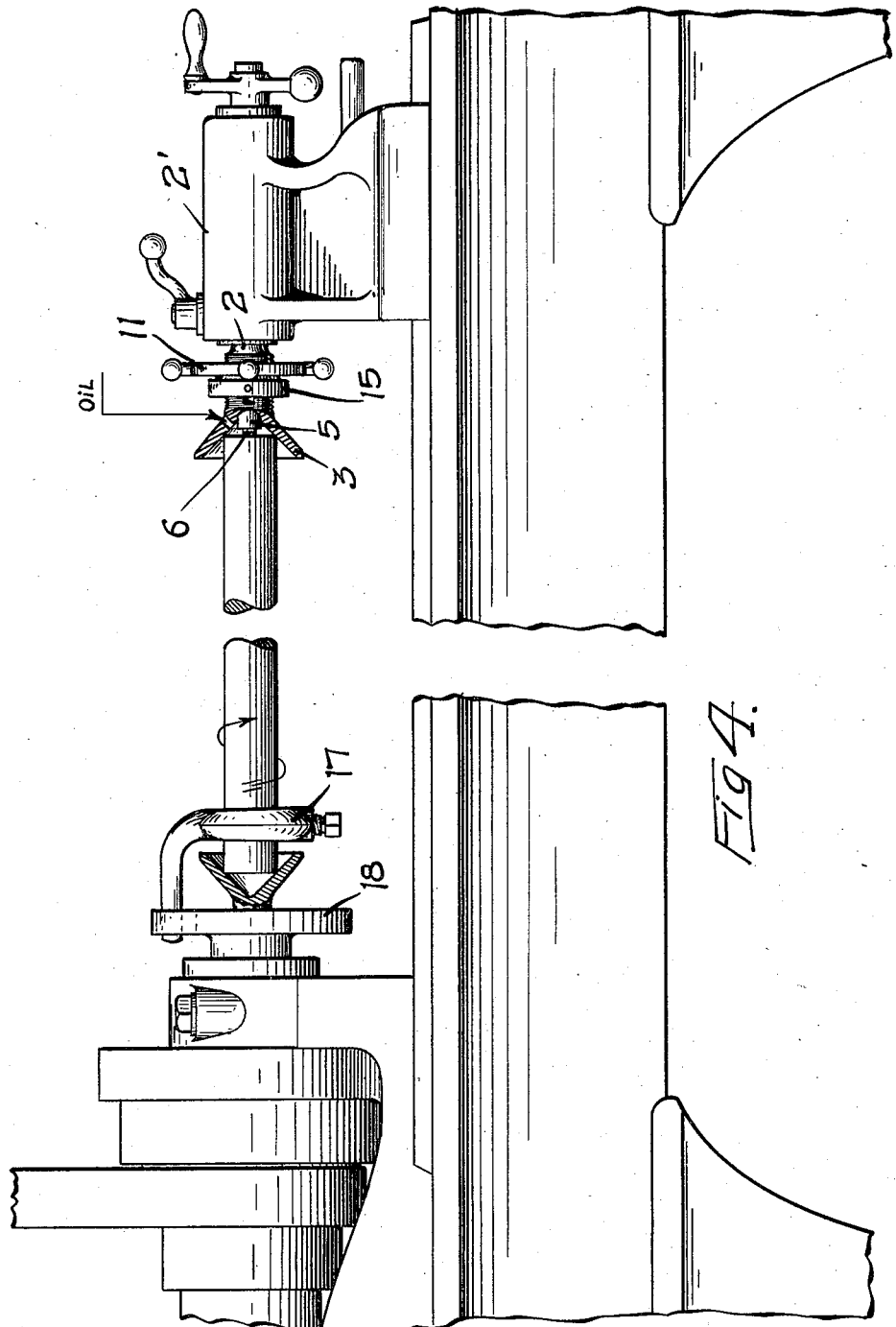

CHARLES BLOMSTROM, OF MINNEAPOLIS, MINNESOTA.

CENTERING-TOOL.

1,028,855.  Specification of Letters Patent.  Patented June 11, 1912.

Application filed December 6, 1909. Serial No. 531,709.

*To all whom it may concern:*

Be it known that I, CHARLES BLOMSTROM, of Minneapolis, Hennepin county, Minnesota, have invented certain new and useful Improvements in Centering-Tools, of which the following is a specification.

My invention relates to centering tools for lathes and the object of the invention is to provide an improved construction which will allow for the convenient and accurate centering of a shaft or other article in the lathe.

My invention consists generally in various constructions and combinations, all as hereinafter described and particularly pointed out in the claims.

In the accompanying drawings forming a part of this specification, Figure 1 is a view, partially in section, of the centering tool embodying my invention, the drill carrier being illustrated in its retracted position, Fig. 2 is a similar view showing the carrier in its projected position, Fig. 3 is a sectional view on the line $x$—$x$ of Fig. 2, Fig. 4 is a front elevation of a lathe with my invention applied thereto.

In the drawing, 2 represents a spindle adapted to be mounted in a tail stock 2′, and having at one end a cup 3 similar to those usually employed in the centering operation. This cup has flaring walls and communicates with a socket 4 wherein a drill carrier 5, preferably cylindrical in form, is arranged and adapted to slide. This carrier has a socket for a drill 6 extending lengthwise therein and is also provided with a transverse socket 7 to receive a pin 8, which is preferably polygonal in cross section and has its ends projecting beyond the walls of the carrier on each side into longitudinal slots 9 which are provided in the walls of the spindle 2. The spindle is exteriorly threaded at 10 and a wheel 11 has an interiorly threaded hub 12 that is movable back and forth on said spindle. On one side of said wheel the hub 12 has an exteriorly threaded flange 13 provided with an annular recess 14 and a cap 15 is interiorly threaded to fit said flange and is provided with an inwardly extending flange 16 which forms the outer wall of the recess 14. The cap 15 is provided with holes therein to receive a spanner wrench. The ends of the pin 8 project into this recess and are engaged by the hub 12 and by the flange 16 so that when the wheel 11 is revolved, the pin 8 will be moved back and forth in the slots 9 lengthwise of the spindle and the carrier 5 will be reciprocated in the socket 4 to project or withdraw the drill.

The parts of the tool are easily assembled and can be easily and quickly manipulated during the centering operation.

In Fig. 4 I have illustrated the application of the invention to a lathe showing the manner of centering the shaft. My invention is shown as mounted in the tail stock 2′ and supports one end of the shaft, while the opposite end is carried in a similar cup and held by a clamp device 17 connected to a face plate 18. The spindle 2 and the parts carried thereby will be stationary and the shaft revolved until it is centered in the cup 3 and the drill hole formed therein.

I claim as my invention:—

1. A centering tool comprising a spindle having a longitudinal socket therein, a drill carrier slidable in said socket, said spindle having longitudinal slots therein, a pin mounted transversely in said carrier, projecting into and through said slots, a wheel having a hub threaded on the walls of said socket, said hub being provided with an exteriorly threaded flange having an annular recess and a cap engaging the threads of said flange and having an inwardly projecting lip forming a wall of said recess, the ends of said pin projecting into said recess for the purpose specified.

2. The combination, with a lathe tail stock, of a spindle mounted therein and having a cup at its outer end, said spindle having a longitudinal socket in the rear of said cup and longitudinal slots in its walls, said spindle being exteriorly threaded, a drill carrier slidable in said socket, a pin mounted in said carrier and projecting into slots on each side of said carrier and beyond the threaded surface of said spindle, an interiorly threaded hub mounted on said spindle and having operating handles, said hub having an exteriorly threaded flange on one side provided with an annular recess to receive the ends of said pin, and an interiorly threaded ring fitting said flange and having an inwardly extending part to lap by the ends of said pin, whereby the movement of said hub back and forth on said spindle will reciprocate said drill carrier, for the purpose specified.

3. The combination, with a lathe tail stock, of a spindle mounted therein and having a longitudinal socket and longitudinal slots in its walls communicating with said socket, said spindle being exteriorly threaded, a drill carrier slidable in said socket and having a transverse opening therein, a pin fitting within said opening and extending through said carrier from side to side and having ends projecting into the longitudinal slots in said spindle, an interiorly threaded hub mounted on said spindle and having operating handles, said hub having means engaging the projecting ends of said pin and operating to move said pin back and forth in said slots to reciprocate said carrier when said hub is revolved.

In witness whereof, I have hereunto set my hand this 30" day of November 1909.

CHARLES BLOMSTROM.

Witnesses:
L. C. CRONEN,
J. JESSEN.

Copies of this patent may be obtained for five cents each, by addressing the "Commissioner of Patents, Washington, D. C."